Patented Aug. 16, 1932

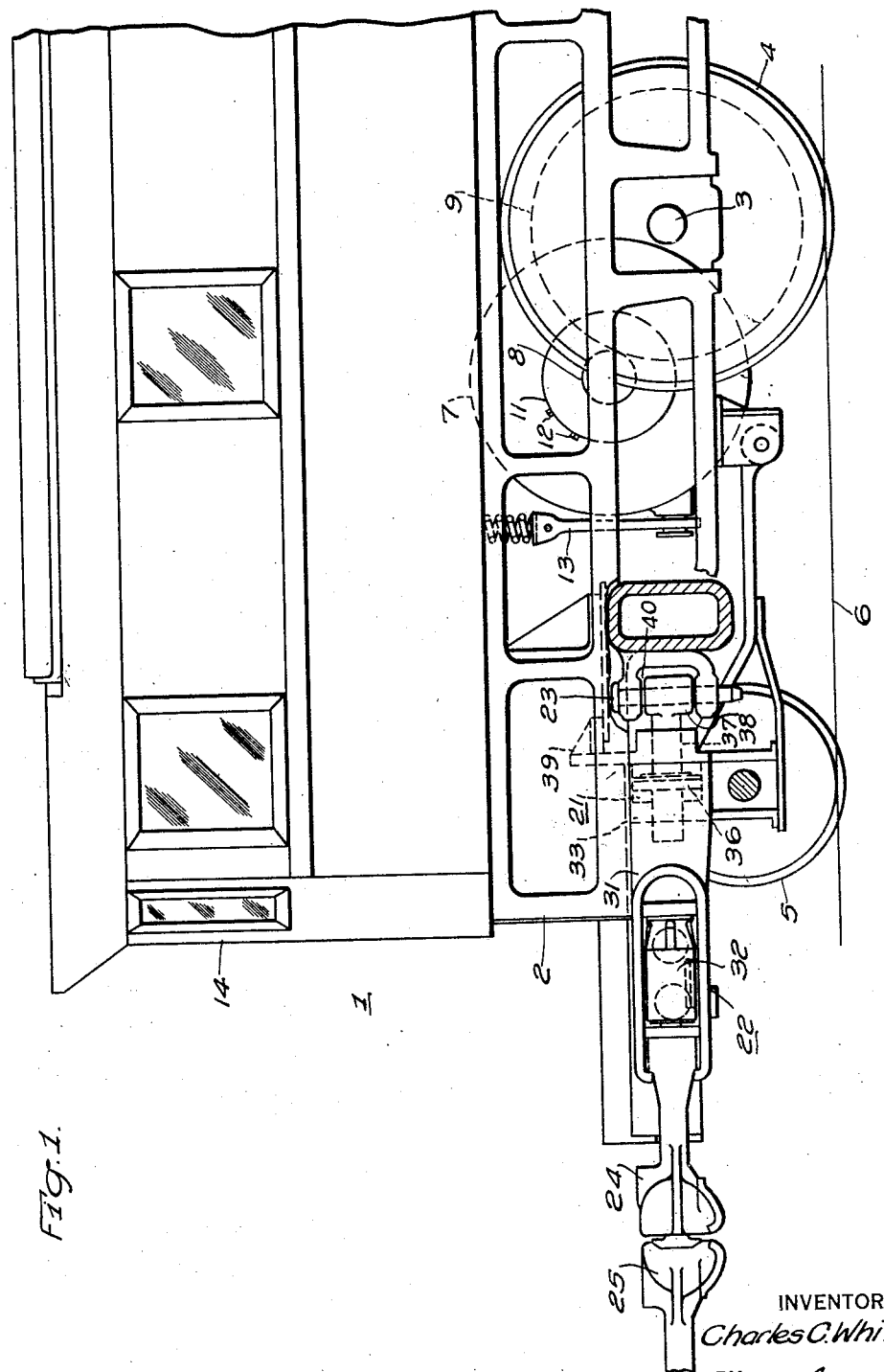

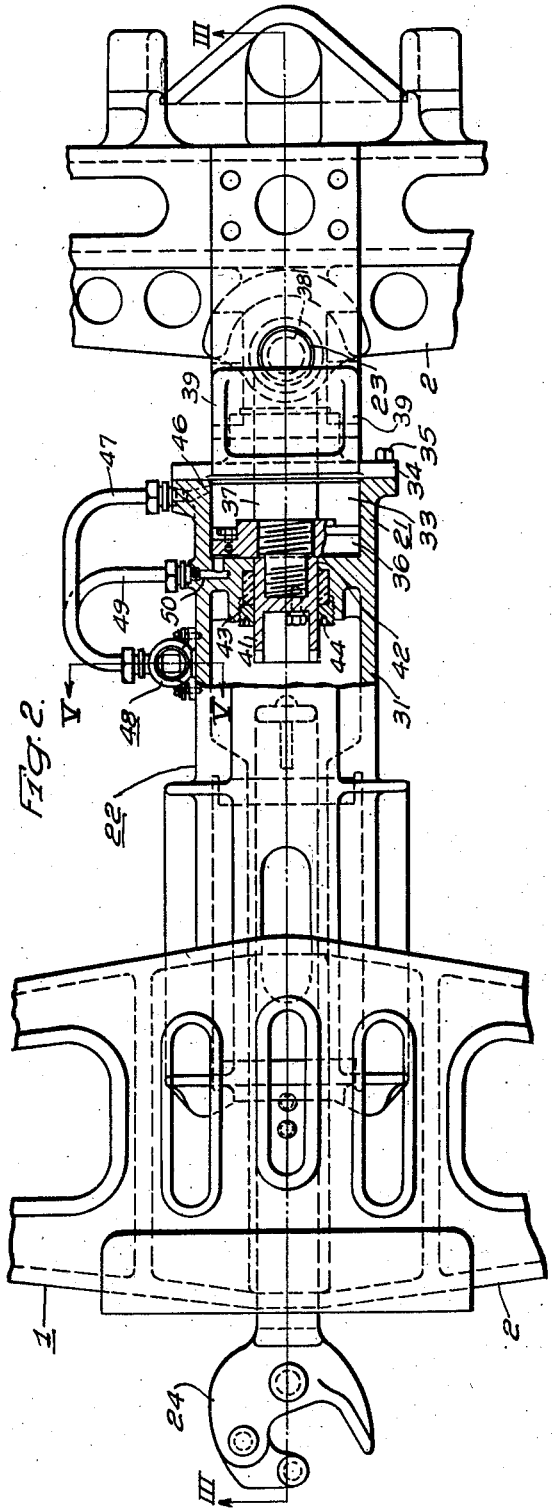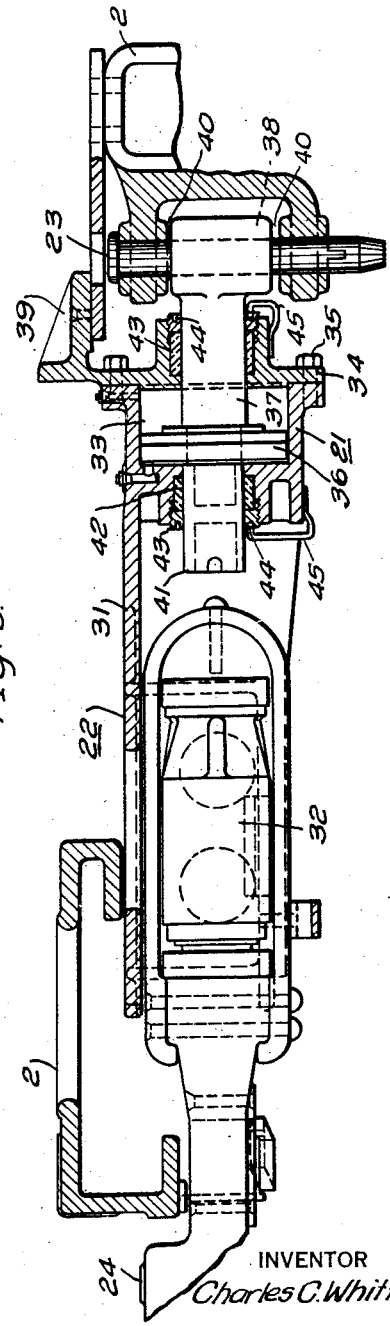

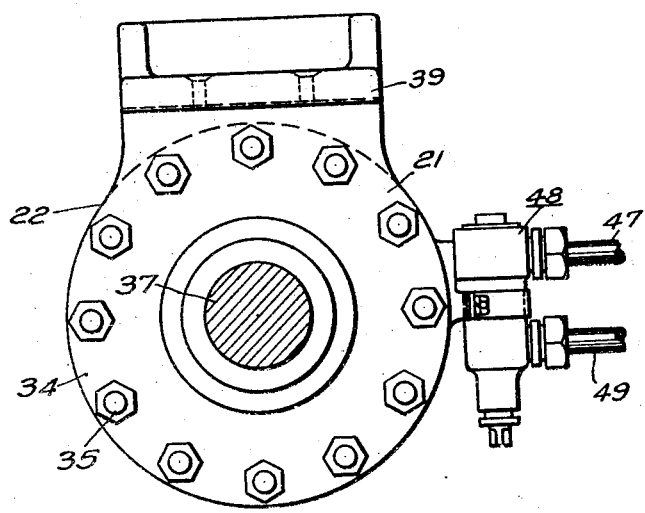
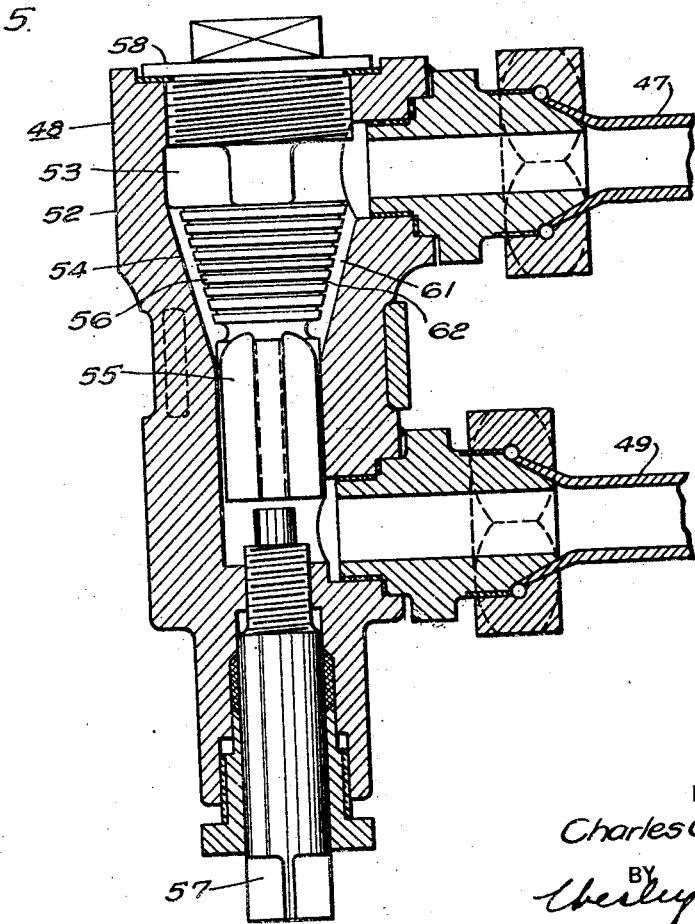

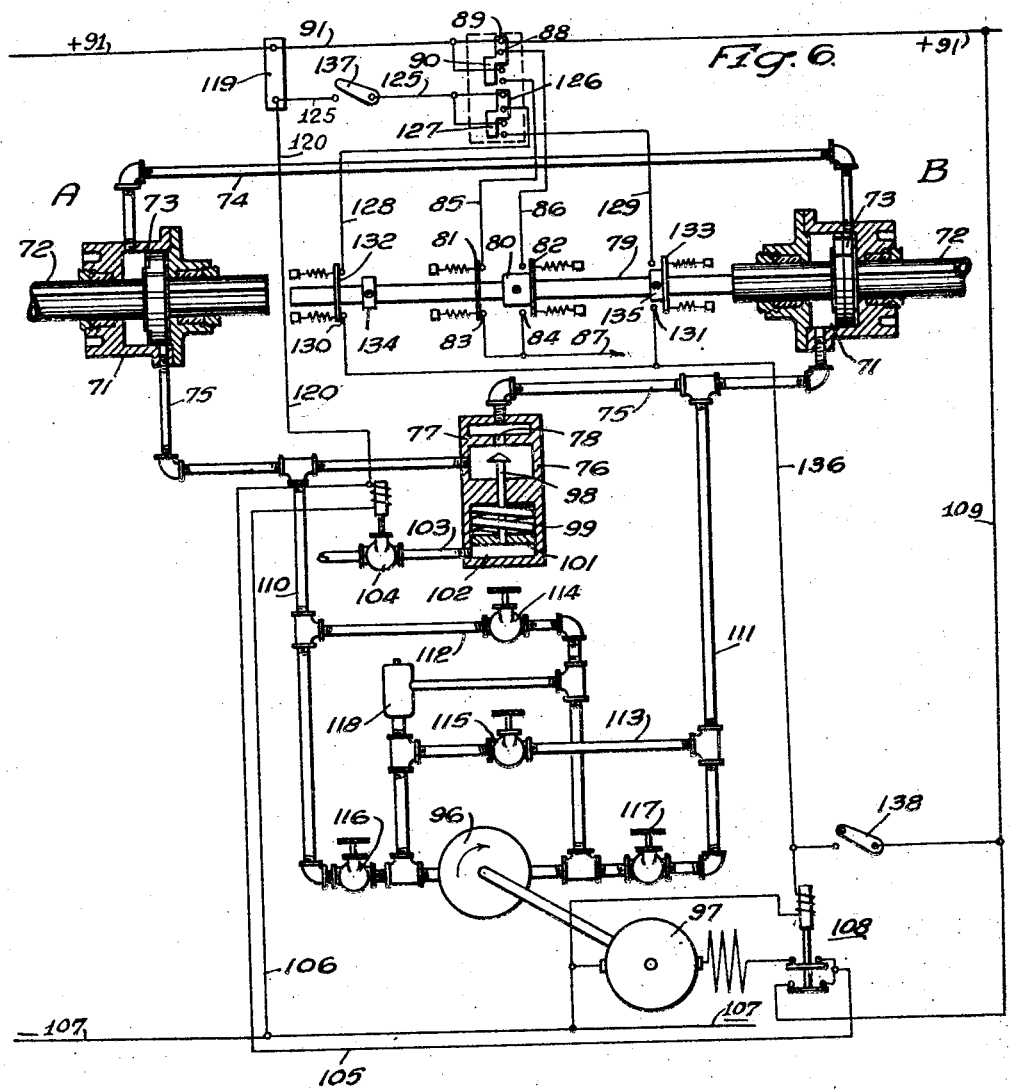

1,872,375

UNITED STATES PATENT OFFICE

CHARLES C. WHITTAKER, OF PITTSBURGH, PENNSYLVANIA, ASSIGNOR TO WESTINGHOUSE ELECTRIC & MANUFACTURING COMPANY, A CORPORATION OF PENNSYLVANIA

PROTECTIVE MEANS FOR RAILWAY VEHICLE MOTORS

Application filed December 7, 1928. Serial No. 324,444.

My invention relates, in general, to railway vehicles and, in particular, to protective equipment for electrical locomotives.

The object of my invention is to provide for protecting the motors of electrical locomotives from excessive localized heating during the starting period.

A more specific object of the invention is to provide for controlling the movement of a locomotive relative to the drawbar to effect a substantially constant speed of relative movement which will depend upon the tractive effort exerted by the locomotive.

In the operation of electrical locomotives provided with motors of the commutating type, when it is attempted to start a heavily loaded train, the motors take a heavy current and, if this current is continued for considerable period, as a result of the inability of the motors to start the train quickly, the motors may be damaged by the burning of the commutator bars or the overheating of the windings. Under starting conditions, the heating is more or less confined to the commutator bars engaged by the brushes.

When a commutator cylinder is burned once by a continued heavy current, its general operating efficiency is impaired and it is susceptible to further damage upon subsequent starting loads or under normal operating conditions. It is, therefore, highly desirable to prevent the first excessive heating of the commutator cylinder to prolong the efficient life of the commutator.

The protection of the commutator, in accordance with the present invention, is accomplished by providing a hydraulic escapement mechanism on the drawbar of the locomotive which permits the locomotive to move forward or creep slowly, relative to the train, during the starting operation. The rate of creeping movement may be regulated to provide for the rotation of the commutator cylinder of the driving motor relative to the brushes, at a speed required to limit the time during which any commutator bar carries the whole starting current taken by the motors.

The foregoing and other objects of the invention may be attained by means of the apparatus described in the following specification and shown in the accompanying drawings, in which;

Figure 1 is a view, in side elevation, of a portion of an electrical locomotive provided with the protective equipment embodying the invention;

Fig. 2 is a view, partially in plan and partially in section, of the drawbar mechanism and protective device shown in Fig. 1;

Fig. 3 is a view, in section, of the drawbar mechanism, taken along the line III—III of Fig. 2;

Fig. 4 is a view, in end elevation, of the protective device shown in Figs. 2 and 3;

Fig. 5 is an enlarged view, in section, of a detail of the protective device, taken along the line V—V of Fig. 2, and Fig. 6 is a schematic diagram of a modified form of the protective device.

Referring, in particular, to Fig. 1 of the drawing, the standard electrical locomotive 1, as shown comprises, in general, a frame portion 2 in which is journalled, in the usual manner, a driving axle 3 having wheels 4 which, together with a bogie truck 5, serve to support the locomotive upon rails 6. The wheels 4 are driven, in the usual manner, by means of a motor 7 having a pinion 8 which meshes with a gear wheel 9 that is securely mounted on the driving axle 3. As shown in the drawing, the motor 7 is of the commutating type, having a commutator cylinder 11 and cooperating brushes 12.

A spring suspension link 13 is provided for supporting one side of the motor 7 upon the frame member 2, the other side being supported upon the wheel axle 3 to constitute what is known in the art as an axle-hung motor. For the purpose of enclosing the driving motor 7 and other electrical equipment, as well as to provide accommodations for the locomotive operator, a cab or body portion 14 is mounted on the frame member 2 in the usual manner.

Under certain conditions of operation, the driving motor 7 may exert its full starting torque upon the driving wheels 4 for some time before the train, to which the locomotive is attached, starts to move. To prevent the heating effect of the full starting current from being concentrated in a few bars of the commutator cylinder 11, the locomotive 1 has been provided with an escapement device 21 which is mounted in, and forms a part of, a drawbar mechanism 22. As shown in Fig. 1, the drawbar mechanism 22 is attached to the locomotive frame 2 by means of a pin connection 23 in such manner that it is disposed to swing as a unit in a horizontal plane and is provided at its extended end with a standard coupling device 24 which is disposed to engage a similar coupling device 25 on the first car of the train (not shown) to which the locomotive is attached. The escapement mechanism 21 is so constructed that it permits the locomotive 1 to move forward slowly, relative to the coupling 25 during the starting period, in order that the commutator cylinder 11 may turn slowly, relative to the brushes 12.

As shown more clearly in Figs. 2, 3 and 4, the drawbar mechanism 22 comprises a yoke 31 for supporting a standard friction draft gear 32, which is disposed to transmit the tractive effort of the locomotive 1 to the coupling mechanism 24 in the usual manner. The escapement mechanism 21, which serves to connect the yoke 31 to the locomotive frame 2, comprises a hydraulic cylinder 33 that is formed at the inner end of, and integrally with, the yoke member 31. The end of the cylinder 33 is closed in the usual manner by means of a cylinder head 34 that is secured to the yoke 31 by cap screws 35. In order to transmit the tractive effort of the locomotive 1 to the yoke 31, the cylinder 33 is provided with a cooperating piston 36 having a piston rod 37 which extends through the cylinder head 34 and engages the pin 23 by means of an eye 38 formed in the enlarged end thereof. To prevent the piston rod 37 from being forced out of alignment with the cylinder 33, the cylinder head 34 is provided with a rearwardly extending bracket 39 that engages a portion of the frame 2 and supports the weight of the draft gear 22 in such manner that clearance spaces 40 are provided above and below the enlarged end of the piston rod 37.

In order that the displacement volumes on each side of the piston 36 may be equal, an extension 41 is provided on the piston rod 37 which passes through an opening 42 in the forward end wall of the cylinder 33. The opening 42 and the cylinder head 34 are each provided, in the usual manner, with packing glands 43 having adjusting nuts 44 that are secured in position by locking means 45.

To restrain the movement of the piston 36 within the cylinder 33, a hydraulic system is provided that comprises an opening 46 in the wall of the cylinder 33 adjacent to the cylinder head 34 which is connected, by means of a pipe 47, to an escapement valve 48 that is mounted on the side of the yoke 31. From the escapement valve 48, a return pipe 49 leads to an opening 50 at the other end of the cylinder 33.

As shown in the enlarged view in Fig. 5, the escapement valve 48 comprises a body portion 52 which encloses a longitudinal passageway 53 that is provided with a conical seat 54. For the purpose of resisting the flow of fluid from the tube 47, through the passageway 53, to the tube 49, a valve member 55, having a conical seat 56 complementary to the seat 54, is disposed, within the chamber 53. An adjusting screw 57 is provided in the lower end of the body portion 52 for supporting the valve member 55 and for regulating a clearance space 61 between the conical seat 56 and the seat 54 in the body portion 52. A cap member 58 is provided at the top of the body portion 52 to provide convenient access to the valve 55 for cleaning or inspecting it.

Referring particularly to Fig. 2, it may be readily seen that, when tractive effort is being exerted by the locomotive 1, the force will be transmitted from the frame 2 to the piston rod 37 and piston 36 by means of the pin 23, thence, by means of the liquid within cylinder 33, to the cylinder head 34 and the draft gear yoke 31. Consequently, the liquid within the space between the piston 36 and the cylinder head 34 will be under comparatively high pressure which may be in the neighborhood of 500 lbs. per square inch. This high pressure within the cylinder 33 will cause the liquid to pass through the tube 47 into the escapement valve 48 and downward through the clearance space 61 between the conical seat 56 of the valve member 55 and the wall 54 of the body portion 52. The flow of the liquid through the passageway 53 is greatly restricted by reason of the small cross sectional area of clearance space 61 between the valve member 55 and the conical seat 54 and by reason of the turbulent conditions which are set up within the clearance space by grooves 62 in the surface of the conical seat 56.

It will be apparent that, by properly regulating the flow of liquid through the escapement device 48, the entire locomotive 1 may be permitted to move forward relative to the coupling device 24 at a speed which is just sufficient to turn the commutator cylinder 11 relative to the brushes 12 in order to prevent excessive localized heating of the surface of the commutator cylinder 11. The length of the cylinder 33 is made such that, under normal conditions, the escapement device will function for two or three minutes, during which the piston 36 will travel from one end of the cylinder to the other. This period of time is usually sufficient for starting an ordinary load.

In order that the piston 36 may be returned to the left end of the cylinder, as shown in Figs. 2 and 3, it is necessary to back the locomotive toward the train, as is ordinarily done in taking slack for starting. When the locomotive is thus backed toward the train, the liquid between the piston 36 and the left end of the cylinder is forced out of the cylinder, through the opening 50 and the pipe 49, into the bottom portion of the escapement device 48. The pressure of the fluid in the bottom portion of the valve chamber 53 will cause the valve member 55 to be lifted, thereby increasing the cross-sectional area of the passageway 61 and permitting the liquid to pass freely into the pipe 47 and through the opening 46 to the opposite side of the piston 36. It may be readily seen that, because of the reduced resistance offered by the escapement device 48, when liquid is passed through it in this direction, it will require only a very short time to return the piston 36 to its initial position. Under ordinary circumstances, this operation is accomplished without special attention by the locomotive driver each time that the train is brought to a stop for the reason that, after the brakes are applied to the locomotive, the force exerted upon the coupling 24, by the remainder of the train, is sufficient to reset the escapement device.

If it is desired to utilize a locomotive embodying the escapement mechanism for pusher service or for both pulling and pushing within a train, a modification of the invention, such as that shown in Fig. 6, may be utilized. In this modification, cylinders 71 may be mounted at the ends A and B of the locomotive in such manner that they are securely connected to the locomotive frame. Piston rods 72, carrying pistons 73 within the cylinders 71, are disposed to be connected to any suitable draft gear (not shown). As illustrated in the drawings, the cylinders 71 are both connected in a hydraulic circuit which includes a pipe 74 that is connected to each of the cylinders at the ends thereof adjacent to the ends of the locomotive. A second pipe 75 is connected to each cylinder at the opposite side of the piston 73 from that to which the pipe 74 is connected and serves to complete the hydraulic circuit through a valve chamber 76 which is divided by a partition or diaphragm 77 having an orifice 78 for limiting the rate of flow of the liquid.

It will be readily seen that, if a force is exerted upon one of the pistons 73 tending to move it within the cylinder 71, fluid will be forced through the closed circuit comprising the pipes 74 and 75, the valve chamber 76 and the other cylinder 71, at a rate which depends upon the size of the orifice 78 and in such direction that both pistons 73 will move in unison within the respective cylinders 71.

Therefore, the speed of movement of the locomotive relative to the drawbar will depend upon the pressure developed in the fluid which, in turn, depends upon the tractive effort exerted. Accordingly, the speed of movement of the locomotive relative to the drawbar will be substantially constant for a predetermined tractive effort, and the time during which relative movement may continue will depend on the lengths of the cylinders.

When the pistons 73 have reached the limit of their travel and engage the ends of the cylinders 71, it is desirable that the power supply to the locomotive be interrupted in order that the operator can not start the locomotive with the escapement device in an inoperative position. In order to obtain the desired operating conditions, one of the piston rods 72 is provided with a control shaft 79 which has a collar 80 disposed thereon to engage and actuate contact plates 81 and 82 which bridge contact terminals 83 and 84 connected in the conductors 85 and 86, respectively. Assuming, for example, that the locomotive is operated to exert tractive effort through piston 73 and cylinder 71 in pulling service with a train attached to B end, then the piston 73 may be drawn to the extreme end of its stroke, as shown in Fig. 6. When the piston 73 is in this position, the contact plate 82 is disengaged from the contact terminals 84, thereby interrupting the circuit through conductor 86, and deenergizing a holding circuit through conductor 87 which is provided for actuating a line switch (not shown) but which is provided, in all locomotives to control the supply of power to the motors.

As shown in the drawings, when the locomotive is being operated to pull through B end, a reversing controller drum 88, having contact segments 89 and 90, is so positioned that the segment 89 establishes a circuit through conductor 86 which extends to the positive terminal 91 of the power supply. When it is desired to operate the locomotive to pull through the A end, the reversing controller drum is actuated to move the contact segment 89 and interrupt the circuit through conductor 86 while the segment 90 functions to establish the control circuit through conductor 85. Under such operating conditions, the power supply to the locomotive will be interrupted when the pistons 73 reach the limits of their travel in one direction in the cylinders 71, as shown in Fig. 6.

In order to again place the locomotive in condition for starting a train, it is necessary that the pistons 73 be actuated to the other ends of the cylinders 71. The resetting of the pistons is, in normal operation, accomplished automatically, as hereinafter explained, through the actuation of a contact segment 119 on the main control drum (not shown) to start a pump 96 which may be driven by a suitable motor 97. In order that the pump 96 may operate effectively, it is necessary that the orifice 78 be closed to prevent the passage of fluid through the valve chamber 76. The orifice is closed by means of a valve member 98 which is disposed within the valve chamber 76 and is biased to its open position by a spring 99. For overcoming the force of the spring 99, a piston 101 is provided on the end of the valve member 98 within a cylinder 102 that is connected, by means of a pipe 103, to a source of fluid pressure, such as the compressed air tank (not shown) that is ordinarily carried on a locomotive.

The pipe 103 is provided with an electrically operated valve 104 that is disposed to control the admission of fluid pressure to the cylinder 102. In order to reset the pistons 73 for another starting operation, provision is made for closing the orifice 78 and starting the pump motor 97 simultaneously. As shown, a switch 108 is provided to connect the motor 97 across the line conductors 91 and 107 and to establish an actuating circuit for the valve 104. When the switch 108 is closed, a motor circuit is established which may be traced from the positive line conductor 91, through conductor 109, the switch 108, the motor field and armature, connected in series, to the negative line conductor 107. The actuating circuit for the valve 104, which is closed by switch 108, extends from the positive line conductor 91, through the conductor 109, an interlock on switch 108, conductor 105, the actuating coil of the valve 104 and conductor 106 to the negative line conductor 107, in such manner that the valve 104 is opened and the motor 97 started.

Since, when the switch 108 is closed, the valve 104 is opened and fluid pressure is admitted to the cylinder 102 to force the valve 98 into the orifice 78 and close it, thereby preventing leakage of liquid through the valve chamber 76. The pipes 75 are connected to the pump 96 by means of pipes 110 and 111 which constitute a shunt or by-pass around the valve chamber 76.

Inasmuch as, in this particular instance, the pump 96 may be operated only in one direction (as indicated by the arrow), it is necessary to provide a second system of pipes 112 and 113 to communicate between the pipes 110 and 111 and be connected in shunt relation with the pump 96 for the purpose of reversing the direction of the flow of liquid through the system.

The pipes 112 and 113 are provided with valves 114 and 115, respectively, which may be closed when it is desired to pump the liquid in one direction through the pipes 110 and 111. If it is desired to force the liquid through the pipes 110 and 111 in the opposite direction, the valves 114 and 115 may be opened, and valves 116 and 117 in the main pipes 110 and 111, adjacent to the pump 96, may be closed. As a particular example, if the locomotive is pulling through B end, that is, from right to left in pulling service, as shown in Fig. 6, the valves 114 and 115 will be closed, and the valves 116 and 117 will remain open.

In order to protect the hydraulic system from excessive pressures which might result from buffing cars or other causes, a relief valve 118 is connected in parallel relation with the pump 96 in such manner that excessive pressures will be relieved.

After the locomotive has started the train to which it is attached, the orifice 78 should be closed in order to prevent further passage of liquid and to maintain the escapement device in condition to function the next time the train is started. For this purpose, the auxiliary contact segment 119, provided on the main control drum (not shown), is disposed to be connected to the electrically operated valve 104 by a conductor 120 in such manner that, when the control drum has been moved past the accelerating notches to the running notches, the conductor 120 will be connected to the positive side 91 of the power supply, and the valve 104 will be opened, as hereinbefore explained, to close the orifice 78.

The actuating circuit for the valve 104 may be traced from the positive side 91 of the power supply, through the contact segment 119, conductor 120, the actuating coil of the valve 104 and conductor 106, to the negative side of the power supply 107.

The auxiliary contact member 119 on the control drum, as mentioned hereinbefore, also serves to automatically start the pump 96 to return the pistons 73 to their original positions after a start has been made. As shown, the contact segment 119 is disposed to connect the positive side 91 of the power supply, by a conductor 125, to the reversing controller drum 88 which may be connected, by either a contact segment 126 or a contact segment 127, to a conductor 128 or to a conductor 129, as the case may be, depending upon the direction in which the locomotive may be operating. From the reversing controller drum 88, the conductors 128 and 129 lead to contact members 130 and 131, respectively, which are bridged by contact plates 132 and 133 which are disposed to be operated by collars 134 and 135 on the shaft 79.

The conductors 128 and 129 then join a common conductor 136 which leads to the electrically operated switch 108 and thence back to the negative side of the line 107.

As may be seen in Fig. 6, after the locomotive has started and the control drum at the A end has been moved to the running position, the contact segment 119 will establish a circuit which extends from the positive side 91 of the supply circuit through conductor 125, contact segment 126, conductor 128, the contact members 130, bridged by the contact plate 132, conductor 136, and the actuating coil of switch 108, to the negative side 107 of the supply circuit. In this manner, a motor circuit is established which may be traced from the positive line conductor 91, through the conductor 109, the contacts on switch 108, the field and the armature windings of the motor 97, to the negative line conductor 107.

When the pistons 73 have been returned to the left end of the cylinder 71, as shown in Fig. 6, the collar 134 will engage the contact plate 132 and disengage it from the contact members 130, thereby interrupting the actuating circuit of the switch 108 and stopping the motor 97.

In order to prevent intermittent operation of the motor, as a result of leakage past the pistons 73, the locomotive operator may de-energize the control circuit by opening a manually operated switch 137 after the pistons 73 have been returned to the desired starting positions. It will be readily seen that, when the locomotive is operated from B end, the reversing controller 88 will connect the conductor 125 to the conductor 129 to establish a holding circuit for the switch 108, and the pump will be stopped when the collar 135 actuates the contact plate 133, to interrupt the holding circuit.

If at any time, it is desired to operate the motor 97 while the locomotive is stationary, as in case the power supply to the motors is interrupted when the pistons 73 reach the limits of their travel, the electrically operated switch 108 may be energized by means of a manually operated switch 138 that is disposed to connect the conductor 136 directly to the conductor 109 and thence to the positive side 91 of the supply circuit 107.

From the foregoing description and explanation, it will be readily seen that my invention provides means for permitting an electrical locomotive to move slowly, relative to the train, during the starting period in order that the heat developed by the starting current in the motor commutator cylinder may be distributed, thereby avoiding excessive localized heating.

Although I have described several embodiments of my invention, it will be obvious to those skilled in the art, that various modifications may be made in the details of the hydraulic cylinders and the escapement-valve mechanism without departing from the spirit and scope of the invention, as defined in the appended claims.

I claim as my invention:

1. A protective device for permitting a locomotive to move relative to the train to which it is attached that comprises a hydraulic cylinder securely mounted in the locomotive, a piston in the cylinder, a drawbar mechanism secured to the piston, and means for controlling the flow of fluid from one side of the piston to the other to permit the piston to move slowly within the cylinder in one direction and means for permitting the piston to move rapidly within the cylinder in the other direction.

2. A protective device for permitting a locomotive to move relative to a train to which it is attached that comprises a standard draft-gear, a hydraulic cylinder securely fastened to the draft-gear, a piston within the cylinder, a piston rod extending from the cylinder and pivotally connected to the locomotive and means mounted on the cylinder for permitting fluid to flow from one side of the piston to the other, said means being adapted to permit the draft-gear to be readily moved toward the locomotive and to restrain it to relatively slow movement away from the locomotive.

3. A system for permitting a locomotive to move relative to the train to which it is attached that comprises a drawbar mechanism, a hydraulic cylinder secured to the drawbar mechanism, a piston within the cylinder, means for securing the piston to the locomotive and means for so controlling the flow of fluid from one side of the piston to the other that the piston is permitted to move in one direction without restraint and is restrained by fluid friction to relatively slow motion in the other direction.

4. A protective device for permitting a locomotive equipped with a drawbar mechanism to move relative to the train to which it is attached that comprises a hydraulic cylinder securely fastened to the drawbar mechanism, a piston in the cylinder pivotally connected to the locomotive frame, and a valve for controlling the flow of fluid from one side of the piston to the other, said valve being disposed to permit the piston to move slowly within the cylinder in one direction and to permit the piston to move rapidly in the other direction.

5. A protective device for permitting a locomotive equipped with a drawbar mechanism to move relative to the train to which it is attached that comprises a hydraulic cylinder securely fastened to the drawbar mechanism, a piston in the cylinder pivotally connected to the locomotive frame, a valve for controlling the flow of fluid from one side of the piston to the other in a manner to permit the piston to move slowly within the cylinder in one direction and rapidly in the other direction, and means for adjusting said valve to control the rate of movement of the piston.

6. In a drawbar mechanism for connecting a locomotive to a load, in combination, a friction-draft-gear for transmitting the tractive effort of the locomotive to the load, a hydraulic cylinder securely fastened to the draft gear, a piston within the cylinder, a piston rod extending from the cylinder and pivotally connected to the locomotive frame, means mounted on the cylinder for permitting fluid to flow from one side of the piston to the other, and an escapement valve disposed to so control the flow of the fluid that the locomotive is permitted to move rapidly in one direction relative to the draft-gear and restrained to a slow movement in the other direction.

7. In a drawbar mechanism for connecting a locomotive to a load, in combination, a friction-draft-gear for transmitting the tractive effort of the locomotive to the load, a hydraulic cylinder securely fastened to the draft-gear, a piston within the cylinder, a piston rod extending from the cylinder and pivotally connected to the locomotive frame, means mounted on the cylinder for permitting fluid to flow from one side of the piston to the other, an escapement valve disposed to control the rate of flow of the fluid, and means for adjusting the valve to vary the rate of flow of the fluid, whereby the locomotive is permitted to move rapidly in one direction relative to the draft-gear and restrained to a slow movement in the other direction.

In testimony whereof, I have hereunto subscribed my name this first day of December 1928.

CHARLES C. WHITTAKER.